US010603923B2

(12) United States Patent
Muehl et al.

(10) Patent No.: US 10,603,923 B2
(45) Date of Patent: Mar. 31, 2020

(54) METHOD FOR DETECTING DEFECTIVE PRINTING NOZZLES IN AN INKJET PRINTING MACHINE

(71) Applicant: HEIDELBERGER DRUCKMASCHINEN AG, Heidelberg (DE)

(72) Inventors: Johannes Muehl, Ennepetal (DE); Hans Koehler, Edingen-Neckarhausen (DE); Roland Stenzel, Heidelberg (DE); Andreas Henn, Neckargemuend (DE); Martin Mayer, Ladenburg (DE); Steffen Neeb, Bensheim (DE); Frank Muth, Karlsruhe (DE); Jan Krieger, Heidelberg (DE); Nicklas Raymond Norrick, Heddesheim (DE); Mina Abosetta, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/272,064

(22) Filed: Feb. 11, 2019

(65) Prior Publication Data
US 2019/0248153 A1 Aug. 15, 2019

(30) Foreign Application Priority Data
Feb. 9, 2018 (DE) .................. 10 2018 202 027

(51) Int. Cl.
*B41J 2/21* (2006.01)
*B41J 2/165* (2006.01)
(Continued)

(52) U.S. Cl.
CPC ......... *B41J 2/2142* (2013.01); *B41J 2/16579* (2013.01); *B41J 2/16585* (2013.01);
(Continued)

(58) Field of Classification Search
CPC .. B41J 2/2142; B41J 2/16585; B41J 2/16579; B41J 2/2146; B41J 2/2139; B41J 29/393;
(Continued)

(56) References Cited

U.S. PATENT DOCUMENTS 7,201,462 B2 4/2007 Shibata et al.
2010/0321437 A1 12/2010 Ogama
(Continued)

FOREIGN PATENT DOCUMENTS

| DE | 60302188 T2 | 7/2006 |
| DE | 102016224303 A1 | 6/2018 |
| DE | 102017217993 B3 | 7/2018 |

*Primary Examiner* — Justin Seo
(74) *Attorney, Agent, or Firm* — Laurence A. Greenberg; Werner H. Stemer; Ralph E. Locher (57) ABSTRACT

A method for detecting defective printing nozzles in an inkjet printing machine includes printing a multi-row printing nozzle test chart formed of horizontal rows of equidistant vertical lines periodically underneath one another, with only printing nozzles in a print head contributing to every row of the test chart corresponding to the horizontal rows. An area coverage element geometrically associated with the test chart is printed, both elements are recorded by an image sensor and analyzed by the computer. The computer analyzes the recorded area coverage element to detect print defects and allocates defects to a region of geometrically close printing nozzles. An analysis of the test chart in the region identifies nozzles causing the defect. Defective printing nozzles are detected based on thresholds, the detected printing nozzles are then compensated, and in the analysis of the recorded area coverage element, influences of the sensor are eliminated by shading correction.

9 Claims, 6 Drawing Sheets (51) Int. Cl.
*B41J 29/393* (2006.01)
*H04N 1/401* (2006.01)
*B41J 25/00* (2006.01)

(52) U.S. Cl.
CPC .......... *B41J 2/2139* (2013.01); *B41J 2/2146* (2013.01); *B41J 29/393* (2013.01); *H04N 1/4015* (2013.01); *B41J 2025/008* (2013.01); *B41J 2029/3935* (2013.01)

(58) Field of Classification Search
CPC ........ B41J 2025/008; B41J 2029/3935; H04N 1/4015
See application file for complete search history.

(56) References Cited

U.S. PATENT DOCUMENTS

| | | | |
|---|---|---|---|
| 2011/0084996 A1* | 4/2011 | Hirato | B41J 2/0451 347/10 |
| 2011/0227988 A1* | 9/2011 | Yamazaki | B41J 29/393 347/19 |
| 2012/0154837 A1* | 6/2012 | Yamazaki | B41J 2/2142 358/1.9 |
| 2016/0279992 A1* | 9/2016 | Aoi | B41J 2/16579 |

* cited by examiner

METHOD FOR DETECTING DEFECTIVE PRINTING NOZZLES IN AN INKJET PRINTING MACHINE

CROSS-REFERENCE TO RELATED APPLICATION

This application claims the priority, under 35 U.S.C. § 119, of German Patent Application DE 10 2018 202 027.2, filed Feb. 9, 2018; the prior application is herewith incorporated by reference in its entirety.

BACKGROUND OF THE INVENTION

Field of the Invention

The present invention relates to a method for detecting defective printing nozzles in an inkjet printing machine.

The technical field of the invention is the field of digital printing.

In digital printing, namely in inkjet printing, a malfunctioning of individual printing nozzles of the print head of the inkjet printing machine is a common phenomenon. Those malfunctions include a plurality of potential types of defects, from nozzles that print a reduced ink drop volume to nozzles that print dots at the wrong place i.e. that print at an angle, and even printing nozzles that fail completely. Foreign bodies, in particular dust particles that have entered the printing nozzle or hardened ink residues in the printing nozzles of the print heads are examples of common causes of such malfunctions. All those different types of malfunctions of defective printing nozzles are referred to by the generic term of "missing nozzle." Such missing nozzles result in specific defects in the print to be created. For instance, a failed printing nozzle generally results in a line-shaped artifact because it cannot apply ink at the intended location. In a monochrome image, a so-called white line is created at the location of the defective printing nozzle because the printing substrate, which is usually white, shines through at that location. In a multicolor print, where multiple colors are printed on top of one another in an inkjet printing machine to create a specific color value, the target color value is distorted because the failed printing nozzle cannot make its intended contribution to the color value. A printing nozzle that has a reduced printing performance results in a similar image defect. Printing nozzles that print with a large angular offset create an additional problem: In addition to a resultant white line that is created because the printing nozzle does not print at the intended location, a dark line is created because the printing nozzle that prints at an angle frequently prints in a region that already receives ink from another printing nozzle. Due to the increased amount of ink that is applied at that location, a line-shaped artifact of a higher color value than intended is created, which is referred to as a dark line.

Various methods are used to compensate for such defective printing nozzles in order to minimize the effects that such printing nozzle malfunctions have on the quality of the print. However, to be able to take compensatory steps, the defective printing nozzle needs to be correctly identified. Various approaches to detecting such defective printing nozzles have become known in the art. For instance, one approach is to record the image that has been created by the inkjet printing machine by using an image sensor and to compare the image that has been digitized in that way with a good quality image to be able to detect deviations that may be caused by defective printing nozzles. However, there are a number of disadvantages to that approach, which is in general implemented as part of an automated quality control process. For instance, it allows only those printing nozzles to be monitored that actually contribute to the creation of the respective print. Thus, printing nozzles that are currently not needed for a current print job cannot be monitored in terms of their functioning. In addition, in many cases, the print image data that are to be created in the course of the print job are unsuitable for an accurate functional check of an individual printing nozzle. Another problem is the allocation of an image defect that has been detected in the recorded image to a specific printing nozzle. Due to restrictions of the image recording system, such as the resolution of the image sensor that is used, such an allocation, which is mandatory to provide accurate functional monitoring is frequently only possible to a limited extent.

Therefore, a common approach to detecting defective printing nozzles is to print so-called printing nozzle test charts that are placed and printed onto the printing substrate outside the actual image. U.S. Patent Application Publication No. 2010/032 1437 A1 discloses a method for color density correction in inkjet printing with (among others) the aim of correcting missing nozzles. The method relies on the use of such printing nozzle test charts. The printing nozzle test charts are recorded by an image recording system and then analyzed. Since the printing nozzle test chart is constructed specifically to ensure that every printing nozzle prints a specific part of the test chart, the analysis of the recorded printing nozzle test chart allows a clear statement to be made on the performance of all printing nozzles that contribute to the print. The analysis is done in a computer-assisted way, usually by the computer of the respective image recording system. However, it is possible to forward the data to a computer that is specifically dedicated to making the analyses. The known printing nozzle test charts themselves vary considerably. One prior art test chart is formed of a respective vertical line printed by every printing nozzle. Since the resolution of the image sensor that records the printing nozzle test chart is frequently lower than the resolution of the print head, the printing nozzle test chart is mostly disposed in such a way that not every printing nozzle in one row prints a vertical line but only every $n^{th}$ printing nozzle in one row of the print head. Then every $(n+1)^{th}$ printing nozzle of the row underneath prints a vertical line and so on until all printing nozzles in the print head that need to be tested have printed their respective vertical line. Since the individual vertical lines may thus be counted and are unequivocal, it is possible to allocate an individual line to a specific printing nozzle. For the analysis, conclusions on the status of the printing nozzle in question may be drawn from parameters such as the degree of deviation of the line from the known target position thereof or the continuity of the printed line. However, a disadvantage of that approach is that a correlation for instance between the degree of deviation of the printing nozzle from its target position and the extent to which this printing nozzle will actually cause a print defect in the actual image (if any) is difficult to establish. For that purpose, there are thresholds for evaluating whether the printing nozzle prints in an acceptable functional range or needs to be classified as defective. If a threshold for determining whether a printing nozzle is defective or not is set to be too sensitive, many errors of judgment on the status of printing nozzles may be the consequence, i.e. printing nozzles that operate basically correctly and exhibit only little deviation but are still suitable for printing would be recognized as defective and later be compensated for. Yet printing nozzle compensations will always result in lower print quality in the print to be created than in a print that is created with a complete set of functioning printing nozzles. However, if a threshold is not sensitive enough, printing nozzles that cause printing problems and cause defects in the print will not be identified and continue to generate defects in the printed image because they remain uncompensated for.

The defined threshold may be a constant value. However, an expedient threshold depends on the current printing conditions such as the ink flow behavior, which in turn depends on the substrate that is printed on and the ink dryer settings, for instance. In addition, the measuring system that records the printing nozzle test chart (i.e. the camera system) may create measuring noise, which applies an error to a theoretically assumed threshold value (e.g. a deviation in the x direction by one half of the width of the printing nozzle writing range). Thus, a definition of a constant value is difficult both from a measurement technology perspective and from the perspective of varying printing conditions.

A method for detecting defective printing nozzles in an inkjet printing unit having a computer is known from German Patent Application DE 10 2017 217 993, wherein a multi-row printing nozzle test chart is printed for detection purposes. In the printing nozzle test chart, only every n-$^{th}$ printing nozzle is active per row m and the respective (n+1)$^{th}$ printing nozzle is active in every further row m+1. In addition, an area coverage element geometrically allocated to the printing nozzle test chart is printed and both elements are recorded by at least one image sensor and analyzed by the computer to identify defective printing nozzles by analyzing the recorded printing nozzle test chart. The method is distinguished in that the computer allocates defects in the area coverage element to printing nozzles in the printing nozzle test chart, parameters of the allocated printing nozzles in the printing nozzle test chart are analyzed by the computer as a function of the defects in the area coverage element and define a range of values from which the computer derives thresholds for every allocated printing nozzle and uses them to detect defective printing nozzles. However, that method only discloses an approach to an improved way of establishing the required thresholds, while it does not disclose any actual detection method that eliminates the disadvantages of detection methods that merely rely on printing nozzle test charts.

A statistical value resulting from the measured values of all printing nozzles may be defined as an alternative threshold. That may be n times the standard deviation of the deviation of the printing nozzle from the target position in the x direction, for instance. That causes printing nozzles that clearly print in a way that is different from the other printing nozzles to be classified as problematic. A printing nozzle may for instance be classified as problematic if the deviation from the target position is greater than 4 times the standard deviation from the target position of all deviations in the x direction of all nozzles. A disadvantage of that method is that it assumes a "functioning" totality of printing nozzles wherein the printing nozzles having values which are below the criterion of n times the standard deviation in general do not cause any defects in a printing operation under the current printing conditions. Yet if many printing nozzles of the set no longer function because of a considerable localized contamination, the threshold defined as n times the standard deviation will be higher than the values of many printing nozzles that no longer function. Those nozzles will not be recognized as problematic.

Thus, it is known from the prior art to print area coverage elements instead of printing nozzle test charts. In such a case, all contributing printing nozzles print a halftone or solid area for test purposes. Then in the course of the image recording process, the area coverage element that has been printed in that way is checked for image artifacts such as white lines, dark lines, or the like, which suggest that there are functionally compromised printing nozzles. That approach is very useful to find out whether there are any printing nozzles that cause problems in the print. However, as it is the case with the detection on the basis of the actual printed image, one is again faced with the problem that the individual printing nozzles that cause the defects cannot be identified within the area coverage element. Instead, it is only possible to identify the region in which the defective printing nozzle must be located but not the individual specific printing nozzle itself that is defective. The latter would only be possible if a high-performance image recording hardware of high image recording resolution was provided. Even then, due to the ink flow behavior, it may only be the defect that is identifiable. The actual printing nozzle may still be impossible to identify because there is no unequivocal correlation between the visible defect in the surface and a specific printing nozzle. In a similar way, the failure of a nozzle pair or of special nozzles in a neighborhood range may only be detected by using a camera of extremely high resolution, if they are not altogether impossible to detect.

German Patent Application DE 10 2016 224 303 discloses printing the area coverage elements in addition to the printing nozzle test chart with a number of different area densities. If a deviated printing nozzle is found in the course of the analysis of the printing nozzle test chart, the corresponding position in the area coverage elements of different area densities may be checked to see whether the defective printing nozzle causes print defects and if so at which area densities that is the case. Compensatory measures for the defective printing nozzle will then be taken only for area densities at which the defective printing nozzle causes defects in the print. However, a disadvantage of that approach is that for an accurate assessment and categorization of a defective printing nozzle that has been detected in the printing nozzle test chart, the area coverage element including the various area densities always needs to be printed onto the printing substrate. Since the recording of the image for quality control purposes including the detection of defective printing nozzles is always a continuous process during a production run on the inkjet printing machine, that means that the printing nozzle test chart and in that case an additional area coverage element including a number of area coverages is printed onto every k-$^{th}$ print sheet. That increases the effort required for the entire detection process to a considerable extent. For it is not only the printing nozzle test chart that needs to be analyzed but also the area coverage element formed of multiple area coverages, and both results need to be continuously compared to one another.

Another aspect is that in accordance with that approach, detection is always based on the printing nozzle test chart. A defective printing nozzle is detected on the basis of the printing nozzle test chart and then the area coverage element is examined to find out whether the defective printing nozzle causes a problem and if so at which area coverages the problem occurs. That means that detection still depends exclusively on the printing nozzle test chart with all the inherent disadvantages described above. The area coverage element is examined only to check the defective printing nozzles that have been detected but does not contribute to the actual detection.

SUMMARY OF THE INVENTION

It is accordingly an object of the invention to provide a method for detecting defective printing nozzles in an inkjet printing machine, which overcomes the hereinafore-mentioned disadvantages of the heretofore-known methods of this general type and in which the method is carried out in a more accurate and more efficient way than the methods known from the prior art.

With the foregoing and other objects in view there is provided, in accordance with the invention, a method for detecting defective printing nozzles in an inkjet printing machine including a computer, wherein:

for detection purposes, at least one multi-row printing nozzle test chart is printed, the printing nozzle test chart is formed of a specific number of horizontal rows of equidistant vertical lines printed periodically and disposed underneath one another, with only those printing nozzles in the print head of the inkjet printing machine periodically contributing to every row of the printing nozzle test chart that correspond to the specific number of horizontal rows, an area coverage element geometrically associated with the multi-row printing nozzle test chart is printed, both elements are recorded by at least one image sensor and analyzed by the computer, and defective printing nozzles are identified by the computer on the basis of thresholds and the detected printing nozzles are then compensated for.

The method is distinguished in that the computer detects print defects by analyzing the recorded area coverage element and allocates the print defects to a region of geometrically close printing nozzles, and that an analysis of the multi-row printing nozzle test chart in this region is used to identify the nozzles that cause the respective print defect.

The core aspect of the method of the invention is that firstly, print defects, for instance white lines caused by missing nozzles, are detected on the basis of the area coverage element. This analysis of the area coverage element leads to the detection of such a print defect, which is then allocated to a region of possible printing nozzles that might be responsible for the detected print defect. As described in the introduction, in most cases, missing nozzle detection in a printed image (and a standardized printed image is precisely what an area coverage element actually is) does not provide any reliable correlation between a detected print defect and a specific printing nozzle. Thus, the method of the invention only defines a region of printing nozzles. This region needs to be big enough to ensure that the printing nozzle that causes the defect is most likely to be located in this specific region. The printing nozzles in this region are then analyzed in terms of the results of the examination of the analysis of the printing nozzle test chart. The examination and analysis of the printing nozzle test chart results in a highly precise assessment of the status of every printing nozzle. The computer may then use this detailed status description of all of the analyzed printing nozzles to automatically identify the printing nozzle that is most likely the one responsible for the detected print defect in the printing nozzle region that has been identified in the analysis of the area coverage element. This printing nozzle is then declared to be defective, is switched off, and compensated for.

Another preferred development of the method of the invention in this context is that in the analysis of the recorded area coverage element, influences of the image sensor are eliminated by shading correction. In order to make the analysis of the recorded area coverage element as error-free as possible, influences of the image sensor on the digital image that it generated and forms the basis of the analysis of the area coverage element, are reduced as much as possible. Shading correction is done by a comparison with the substrate. In this way, light and shade effects in the digital image of the recorded area coverage element may be reliably eliminated by shading correction. This is important to prevent the analysis algorithm from detecting print defects that do not exist on the printed area coverage element but are only introduced into the digital image of the recorded area coverage element by the image recording process.

A further preferred development of the method of the invention in this context is that during the analysis of the recorded area coverage element, the allocation of detected print defects in the form of tone value deviations is achieved by using pixel-to-printing nozzle allocation points that are printed between the multi-row printing nozzle test chart and the area coverage element and are recorded by the at least one image sensor. In order to simplify an allocation of specific regions in the area coverage element to the respective associated printing nozzle test chart, pixel-to-printing nozzle allocation points are printed between the printing nozzle test charts and the area coverage element. These pixel-to-printing nozzle allocation points provide an approximate allocation of a print defect that has occurred in the area coverage element to a specific printing nozzle. The pixel-to-printing nozzle allocation points are printed circles or discs having a center or focal point which is printed by a specific printing nozzle that is known to the system, allowing the camera pixel at the focal point of the printed circle to be allocated to the printing nozzle in an image analysis process.

An added preferred development of the method of the invention in this context is that during the analysis of the recorded area coverage element, the computer makes a trend adjustment to increase the signal-to-noise ratio. The analysis of the area coverage element is done in such a way that the recorded tone values that have been established by the computer are processed to create a tone value signal. The tone value signal is the basis for the detection of the print defects that are present in the area coverage element. In order to make this detection less prone to errors, it is thus expedient to detect systematic influences on the tone value signal through the location and to reduce the tone values in the signal by these effects. Due to this trend adjustment, print defects such as white lines may be more easily detected during the analysis.

An additional preferred development of the method of the invention in this context is that during the analysis of the recorded area coverage element, the computer detects print defects by iteratively assessing all gray values along all printing nozzle lines and considering deviating gray values as print defects, wherein the region of geometrically close printing nozzles is defined as the printing nozzle line with the deviating gray values and neighboring printing nozzle lines. In the analysis of the area coverage element, the computer goes through all gray values to assess whether there are any gray values that deviate. Deviating gray values are gray values greater than 5 sigma of all gray values. The result of this iterative process is a list of printing nozzle numbers that correspond to a deviation in the form of an artifact. Since the pixel-to-printing nozzle allocation points do not provide an unequivocal allocation of the artifact to a specific printing nozzle, the printing nozzle number that has been found will be extended by a range of ±5 printing nozzles, for example. The actual defective printing nozzle is highly likely to be located in this printing nozzle region.

Another preferred development of the method of the invention in this context is that during the analysis of the recorded multi-row printing nozzle test chart, the computer establishes printing nozzle parameters such as the continuity and the position of the vertically printed equidistant lines to assess the printing performance of the printing nozzles. Therefore, in order to identify the specific defective nozzle in the detected region of printing nozzles, every printing nozzle in this region is subjected to a more detailed examination. This is done by an analysis of the recorded printing nozzle test chart in which the computer assesses printing nozzle parameters such as the continuity and position of the equidistant vertical lines that have been printed in the printing nozzle test chart by every individual printing nozzle, thus assessing the status of every single printing nozzle.

An added preferred development of the method of the invention in this context is that during the analysis of the recorded multi-row printing nozzle test chart, for every print defect detected in the area coverage element, the computer examines the associated region of geometrically close printing nozzles in terms of the established printing nozzle parameters thereof and identifies the defective printing nozzle in this region on the basis of that examination. Due to the examination of the region of printing nozzle numbers that has been identified by the analysis of the area coverage element as having a high probability of including a defective printing nozzle in terms of the status of the printing nozzles located in the region—the status having been established by the analysis of the printing nozzle test chart—the defective printing nozzle may be reliably detected in the given region. In general, the defective printing nozzle in the region in question will be the one having a status which was found to be most critical in the analysis of the printing nozzle test chart.

An additional preferred development of the method of the invention in this context is that during the examination of the detected print defects in terms of the established printing nozzle parameters of the geometrically close printing nozzles, the computer applies a classification model that is a function of a number of parameters such as the phase and amplitude values of a tone value signal generated from the established printing nozzle parameters. The computer applies a classification model to make the examination of the detected regions exhibiting print defects in terms of the printing nozzle parameters obtained from the printing nozzle test chart more efficient. This classification model is applied to all regions that are known from the analysis of the area coverage element. The classification model depends on a number of parameters such as the phase and amplitude values. Since the area coverage element is used for every print color that is used in the printing operation because every print color, i.e. process color, is naturally printed by a separate print head with its own printing nozzles, the classification model is likewise adapted for every process color that is used.

Another preferred development of the method of the invention in this context is that the method of the invention is only implemented during a training phase at the beginning of a print job. Since a lot of space is always needed to print all printing nozzle test charts, pixel-to-printing nozzle allocation points, and area coverage elements, the method of the invention is only carried out in its entirety during a training phase. For instance, it is conceivable to print only the printing nozzle test chart during the subsequent production run to be able to provide real-time information on the current status of the printing nozzles that are in use. If the status of an examined printing nozzle deteriorates to a considerable extent, a fast reaction that involves switching the nozzle off and compensating for it will still be possible.

A concomitant preferred development of the method of the invention in this context is that the printing and analysis of the multi-row printing nozzle test chart are only carried out during a training phase at the beginning of a print job to establish the printing nozzle parameters whereas the printing and analysis of the area coverage element to detect the print defects and the associated regions of geometrically close printing nozzles is carried out continuously. It is likewise possible to use the reverse approach, i.e. to continuously print the area coverage elements during the production run in order to be able to immediately identify newly occurring defective printing nozzles by analyzing the area coverage elements. The printing nozzle test charts are only printed at the beginning during the training phase. The intent is not to establish the current status of the printing nozzles but rather to fine-tune the pixel-to-printing nozzle mapping, i.e. the allocation of the pixels from the area coverage element to the specific printing nozzles in such a way as to be able to allocate print defects that occur in the area coverage element to a specific printing nozzle even without a comparison with the printing nozzle test chart.

Other features which are considered as characteristic for the invention are set forth in the appended claims.

Although the invention is illustrated and described herein as embodied in a method for detecting defective printing nozzles in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
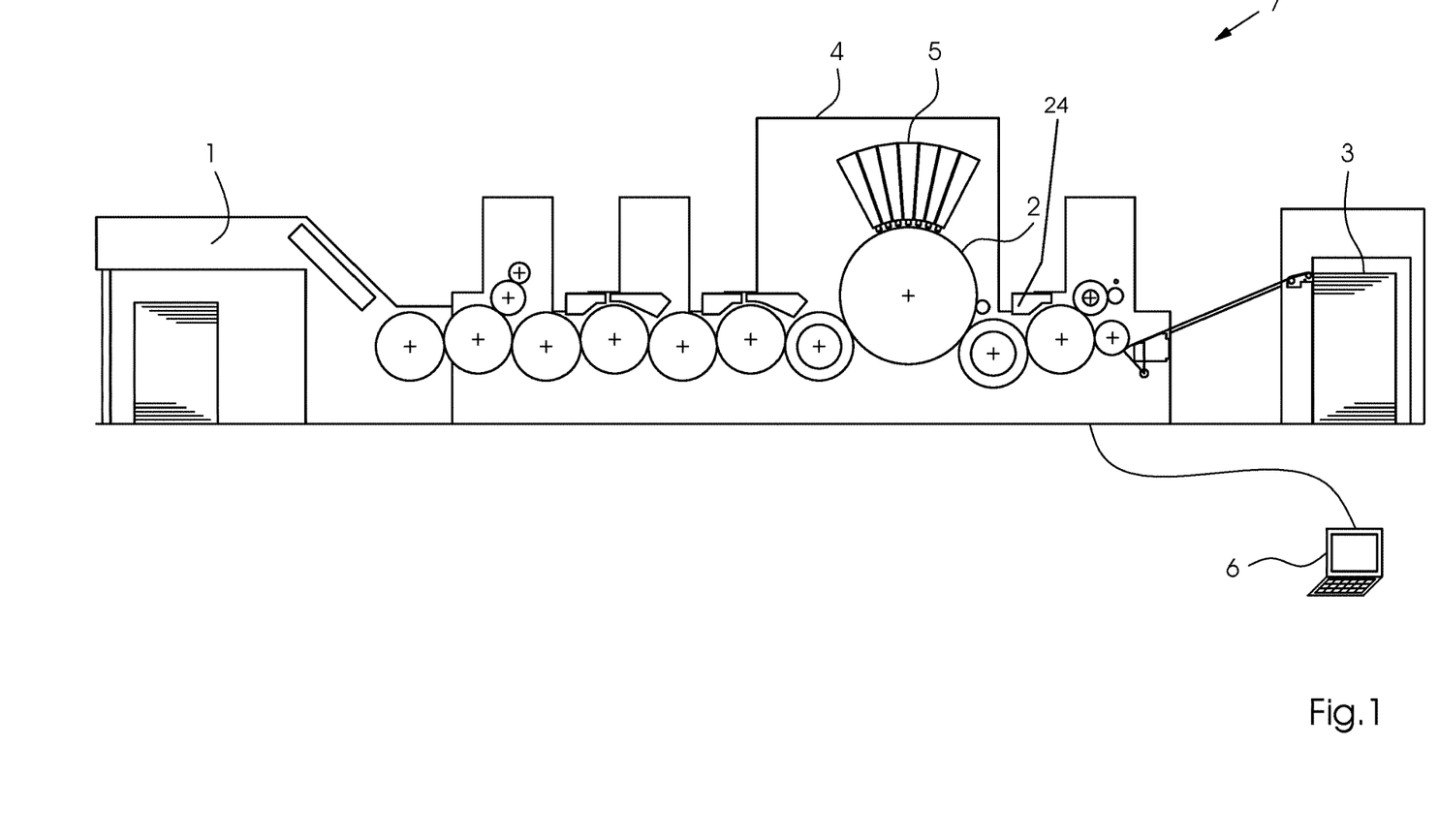
FIG. 1 is a diagrammatic, longitudinal-sectional view of an example of the construction of a sheet-fed inkjet printing machine.
Figure 2:
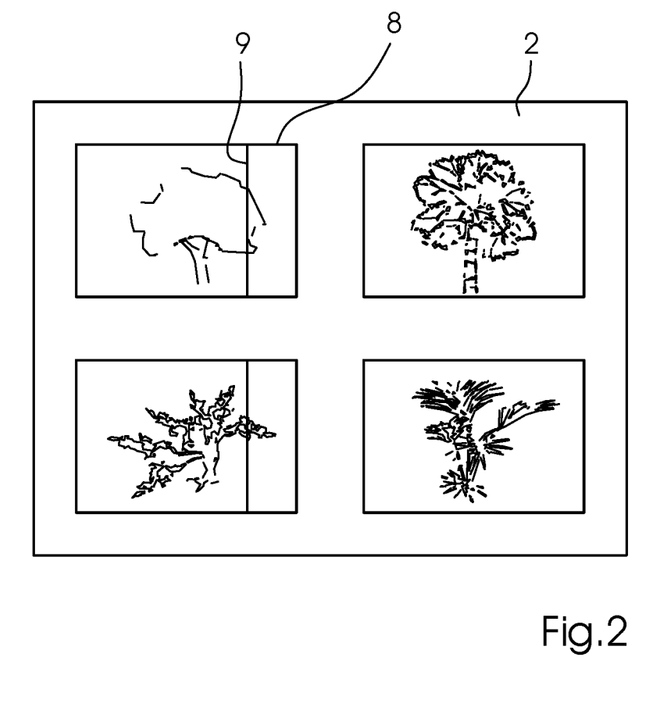
FIG. 2 is a plan view of a printing substrate illustrating an example of a white line caused by a missing nozzle.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. FIG. 1 shows an example of the fundamental construction of such a machine 7, including a feeder 1 for feeding a printing substrate 2 to a printing unit 4 where it receives an image printed by print heads 5, as well as a delivery 3. The inkjet printing machine 7 is a sheet-fed inkjet printing machine 7 controlled by a control unit 6. As described above, individual printing nozzles 23 (see FIG. 6) in the print heads 5 in the printing unit 4 may fail while the printing machine 7 is in operation. Such a failure results in white lines 9 or, in the case of multicolor prints, in distorted color values. An example of such a white line 9 in a printed image 8 is shown in FIG. 2.

Figure 3:
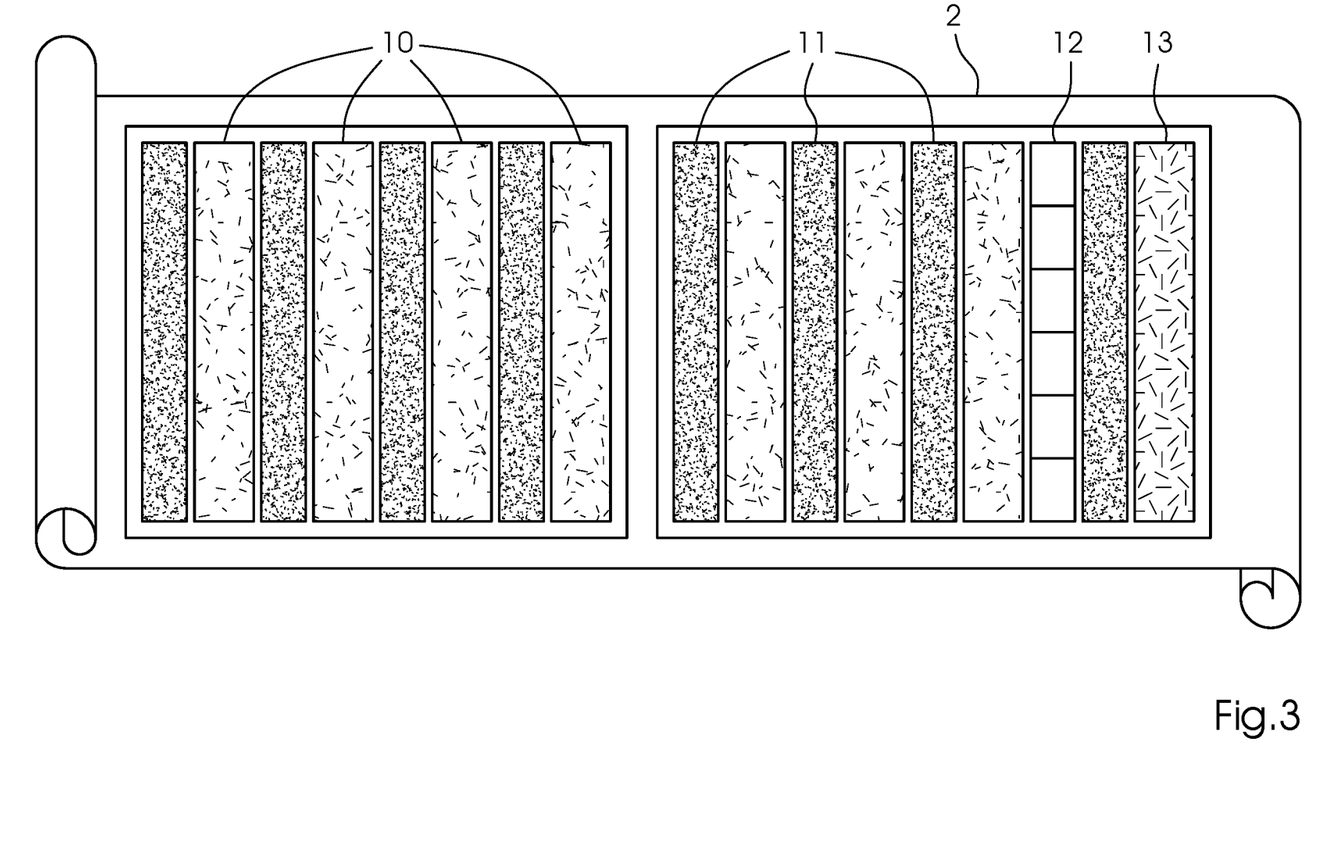
FIG. 3 is a perspective view illustrating the structure of test charts and area coverage sequence that are printed for detection purposes.
Figure 5:
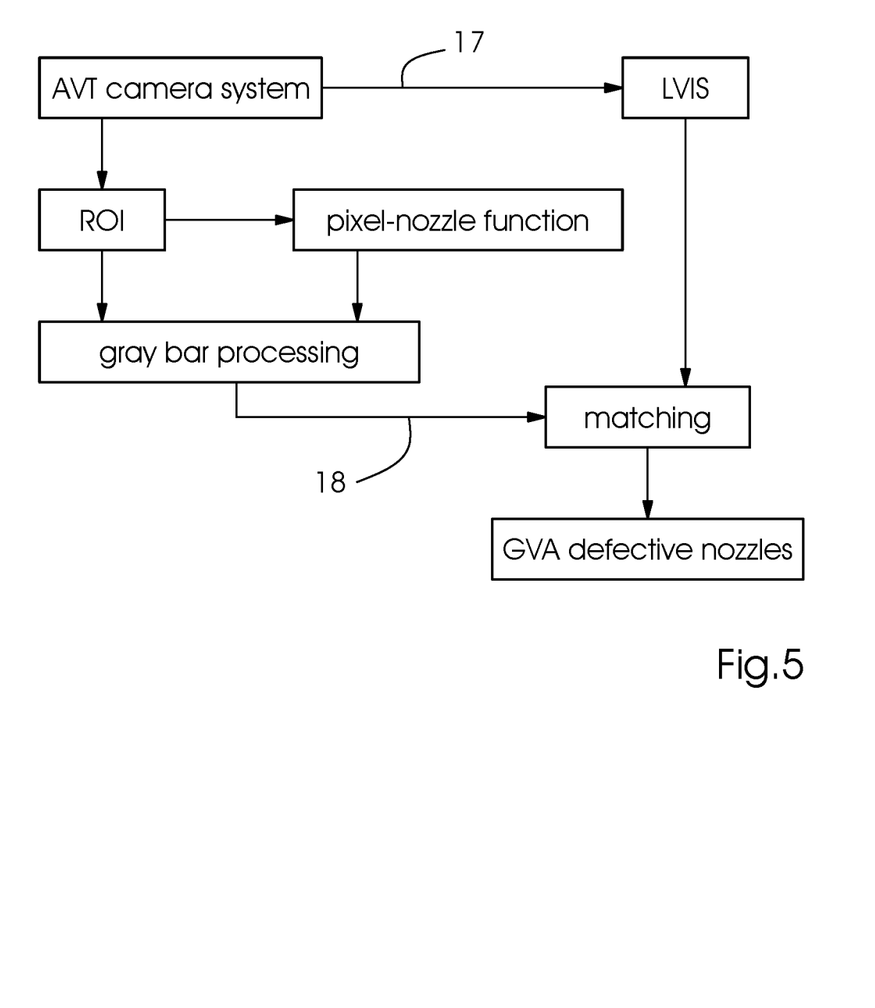
FIG. 5 is a block diagram illustrating the structural components for the method of the invention.

A preferred embodiment of the method of the invention is structurally shown in FIG. 5 in the form of a block diagram including the contributing components. In order to identify printing nozzles that are responsible for vertical artifacts such as "scratches" or white lines 9, a sequence of objects shown in more detail in FIG. 3 is printed. In this process, printing nozzle test charts 10 to which all relevant printing nozzles contribute and preceding nozzle load areas 11 are the first elements to be printed. In order to provide a statistically sufficient representation of the printing nozzle parameters in the standard printing nozzle test chart 10, the printing nozzle test chart 10 is printed at least eight times for every color. The image recording system of the inkjet printing machine 7, preferably an AVT camera system, processes the printing nozzle test charts 10 using an algorithm for determining the printing nozzle parameters. In more concrete terms, what is assessed is the deviation of the printing nozzles from the target position, also referred to as the phase 20, and the continuity of the printing nozzle, also referred to as the amplitude 19. In addition, the AVT camera system sends a nozzle list 17 to the LVIS (short for Linoprint Variable Image System). The list 17 includes all printing nozzles that are to be monitored. Based thereon, a log file is created. The log file includes the nozzle status.

The tone value areas of the area coverage element 13 are printed behind the printing nozzle test charts 10. At least one image sensor 24 records a printing nozzle test chart 10 and an area coverage element 13. In this context, the use of a 50% to 60% halftone is preferred because it is most sensitive to problematic printing nozzles 23 in terms of both the human eye and image analysis. Like the standard printing nozzle test charts 10, the block including the tone value areas 13 includes preceding printing nozzle load areas 11 and "pixel-to-printing-nozzle allocation points" 12. The latter are printed circles or discs having a center or focal point which is printed by a known printing nozzle, which means that by using image analysis methods, precisely the camera pixel at the focal point of the printed element may be allocated to the printing nozzle.

Figure 4:
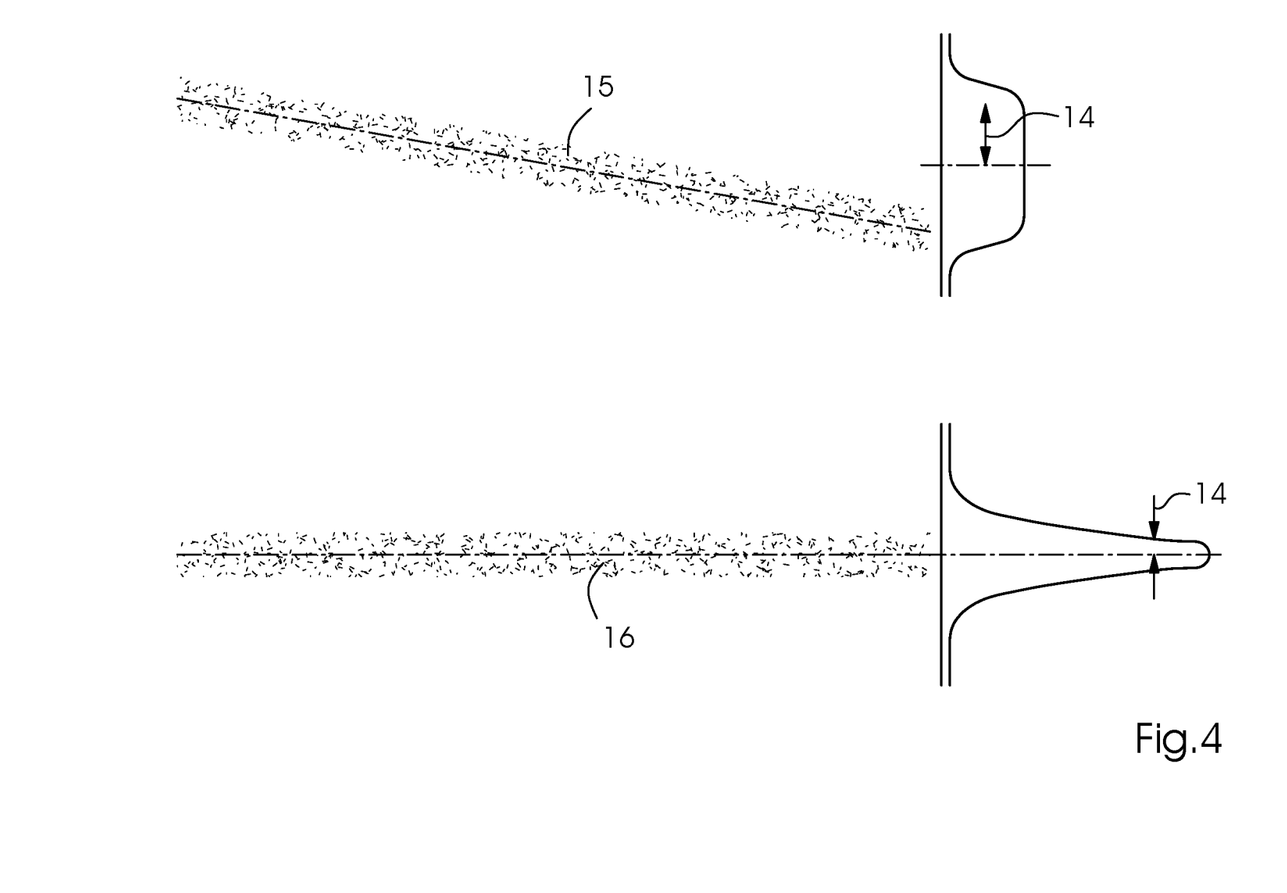
FIG. 4 illustrates the effects of a trend adjustment on the gray value signal.

The tone value element 13 that has been recorded by the camera of the image recording system is processed in a computer-assisted way. This may be done by using the control unit or computer 6 of the image recording system or any other desired computer that is suitable for this purpose. In this process, undesired camera influences in the regions of interest (ROI) are computationally eliminated by so-called shading correction. This is done by a comparison with the substrate 2. Subsequently, the "pixel-to-printing-nozzle allocation" analysis points are used for a conversion from "tone value-to-pixel" to "tone value-to-printing nozzle." In this process, a signal 15 is generated out of the established tone values. This tone value signal 15 is then processed and filtered. For this purpose, it is expedient in advance to establish systematic influences of a small order, e.g. of the 1st/2nd/3rd order, based on the standard deviation (S) 14 through the location, and to reduce the tone values 15 by these effects before the iterative process. An example of the effects of such a trend adjustment on the tone value signal 16 is shown in FIG. 4. In the tone value signal 16 that has been trend-adjusted in this way, artifacts like white lines 9 are more reliably found because the signal-to-noise ratio increases due to a smaller standard deviation (S) 14 as shown in FIG. 4.

Once the tone value signal 16 has been processed and filtered, it is checked for artifacts 9 in an iterative process. In an iteration, gray value outliers that correspond to a print artifact are looked for. Outliers may be defined as more than five times the standard deviation (S) 14 of all gray values, for instance. After the iteration, these outliers are removed from the set of gray values. After n iterations, there will be no more outliers. This process results in printing nozzle numbers 18 that correspond to an artifact. The next step is an examination in terms of the printing nozzle parameters because so far no unequivocal allocation based on the pixel-to-printing nozzle allocation function is possible and there is more than one printing nozzle that may cause an artifact 9.

For this examination, the detected printing nozzle number is increased by a range of +/−5 printing nozzles, for instance. The actual defective nozzle 23 is highly likely to be in the resultant printing nozzle range including numbers of suspected printing nozzles 18. The size of the region 18 is a function of the accuracy of the applied pixel-to-printing-nozzle allocation. Now the printing nozzle regions 18 declared defective and the remaining printing nozzles 22 declared good in accordance with the detection process so far are used to train a classification model in the form of a machine learning model, also known as a "supervised learning support vector machine classification model" (SVM), which is then applied to the respective measurement.

Figure 6:
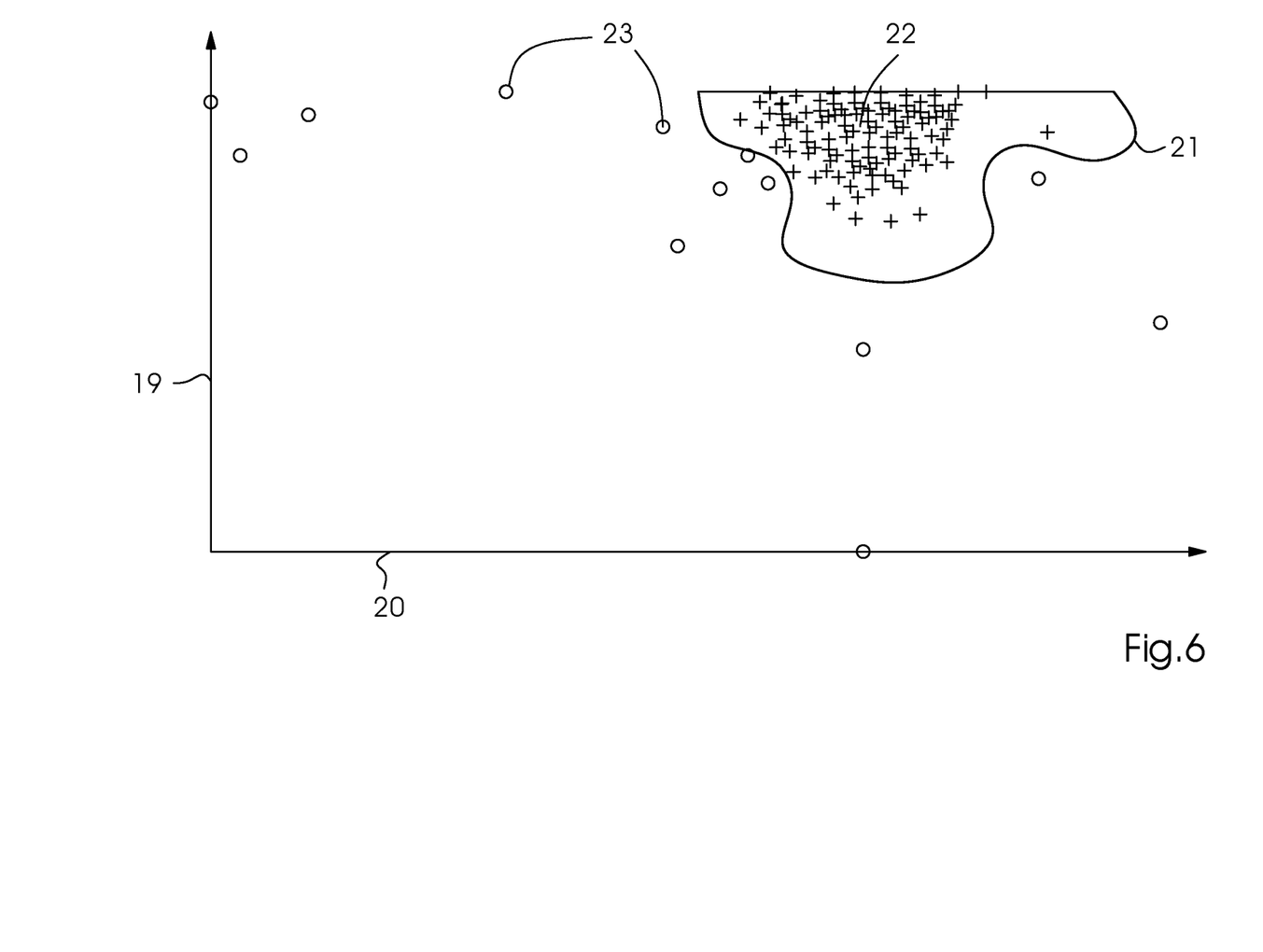
FIG. 6 is a graph illustrating an example of a classification model.

An example of a result of the application of such a classification model is shown in FIG. 6. Limit conditions 21 separate the good printing nozzles 22 from the defective printing nozzles 23. The SVM classification model depends on two parameters. The first parameter is the deviation of the line from a target position of the printing nozzle, i.e. the deviation in a direction transverse to the direction of paper travel, corresponding to the phase 20. The phase values 20 vary from −∞ to ∞. The second parameter is the power of the printing nozzle, also referred to as its amplitude 19. The amplitudes vary from 0 to 1. The printing nozzles have originally been labeled as good printing nozzles 22 or defective printing nozzles 23 by using a gray bar analysis. For every color, an SVM classification model is trained by using the aforementioned data, i.e. phase 20, amplitude 19, and labels 22, 23. Then the model is used to classify the printing nozzles. The entire process is repeated n times, for instance ten times, using the various printing nozzle test charts 10. The minimum number of repetitions is eight. In the end, the results of all detections are logically linked by "or" to create the final list 17 of defective printing nozzles, see FIG. 6.

Note: the SVM classification model is not trained directly with the raw data, i.e. the "raw phase" and "raw amplitude" but with standardized data, which look as follows:

standardized phase=(phase−µ phase)/σphase

µ phase and σphase—average value and standard deviation of the phase values standardized amplitude=(amplitude−μ amplitude) σamplitude μ amplitude and σamplitude—average value and standard deviation of the amplitude values Apart from using the machine learning model, it is possible to use the method of logistic regression with the explaining factors mentioned above to analyze the data.

One should bear in mind, however, that the result of a logical "or" link of all detections ("worst-of approach") depends on the number of detections. This means that if the number of detections remains variable, for instance a minimum of eight, after approximately 25 to 30 detections, a type of stability limit is asymptotically approached because otherwise for a varying number of detections, comparability would decrease. In the preferred exemplary embodiment, a variance analysis is used to analyze the n detections. Thus initially, one is independent of the number of detections in terms of the position parameters. What remains is a dependence of the confidence interval on the number of detections/degrees of freedom.

The result is a list of defective printing nozzles 17 that may be associated with a print/image artifact.

Thus, by using a combination of printing nozzle test charts 10 and area coverage elements 13, the method of the invention allows printing nozzles 23 that are responsible for vertical artifacts such as scratches or white lines 9 to be identified. In this way, the accuracy of the process of analyzing an area coverage element 13 may be improved to a considerable extent and the low resolution of the camera, which makes detection exclusively from an area coverage element 13 impossible, may be at least partially counteracted.

The following is a summary list of reference numerals and the corresponding structure used in the above description of the invention.

LIST OF REFERENCE SYMBOLS 1 feeder
2 current printing substrate/current print sheet
3 delivery
4 ink jet printing unit
5 ink jet print head
6 computer
7 inkjet printing machine
8 image on the current print sheet
9 white line
10 printing nozzle test chart
11 printing nozzle load areas
12 pixel-nozzle allocation points
13 area coverage element
14 standard deviation S
15 tone value signal with signal noise distance
16 trend-adjusted tone value signal with signal noise distance
17 printing nozzle list
18 numbers of defective printing nozzles
19 amplitude values
20 phase values
21 limit condition
22 good printing nozzles
23 defective printing nozzle

The invention claimed is:

1. A method for detecting defective printing nozzles in an inkjet printing machine, the method comprising the following steps:

printing at least one multi-row printing nozzle test chart for detection purposes, forming the at least one multi-row printing nozzle test chart of a specific number of horizontal rows of equidistant vertical lines printed periodically and disposed underneath one another, with only those printing nozzles in a print head of the inkjet printing machine periodically contributing to every row of the at least one multi-row printing nozzle test chart corresponding to the specific number of horizontal rows;

printing an area coverage element geometrically associated with the at least one multi-row printing nozzle test chart;

using at least one image sensor to record the at least one multi-row printing nozzle test chart and the area coverage element and using a computer to analyze the at least one multi-row printing nozzle test chart and the area coverage element;

using the computer to analyze the recorded area coverage element to detect print defects and allocate the print defects to a region of geometrically close printing nozzles;

using an analysis of the at least one multi-row printing nozzle test chart in the region to identify the nozzles causing the respective print defect, and using the computer to detect defective printing nozzles based on thresholds;

compensating for the detected printing nozzles; and eliminating influences of the image sensor by shading correction in the analysis of the recorded area coverage element.

2. The method according to claim 1, which further comprises during the analysis of the recorded area coverage element, carrying out the allocation of detected print defects as tone value deviations by using pixel-to-printing nozzle allocation points printed between the at least one multi-row printing nozzle test chart and the area coverage element and recording the allocation points by using the at least one image sensor.

3. The method according to claim 1, which further comprises during the analysis of the recorded area coverage element, using the computer to make a trend adjustment to increase a signal-to-noise ratio.

4. The method according to claim 1, which further comprises during the analysis of the recorded area coverage element, using the computer to detect print defects by iteratively assessing all gray values along all printing nozzle lines and considering deviating gray values as print defects, and defining the region of geometrically close printing nozzles as the printing nozzle line with the deviating gray values and adjacent printing nozzle lines.

5. The method according to claim 1, which further comprises during the analysis of the recorded at least one multi-row printing nozzle test chart, using the computer to establish printing nozzle parameters including a continuity and a position of the vertically printed equidistant lines to assess a printing performance of the printing nozzles.

6. The method according to claim 5, which further comprises during the analysis of the recorded at least one multi-row printing nozzle test chart, for every print defect detected in the area coverage element, using the computer to examine the associated region of geometrically close printing nozzles in terms of established printing nozzle parameters thereof and to identify the defective printing nozzle in the region based on the examination.

7. The method according to claim 6, which further comprises during the examination of the detected print defects in terms of the established printing nozzle parameters of the geometrically close printing nozzles, using the computer to apply a classification model being a function of a plurality of parameters including phase and amplitude values of a tone value signal generated from the established printing nozzle parameters.

8. The method according to claim 1, which further comprises implementing the method only during a training phase at a beginning of a print job.

9. The method according to claim 1, which further comprises:
- only carrying out the printing and analysis of the at least one multi-row printing nozzle test chart during a training phase at a beginning of a print job to establish printing nozzle parameters; and
- continuously carrying out the printing and analysis of the area coverage element to detect the print defects and the associated regions of geometrically close printing nozzles.

* * * * *